(12) United States Patent
Davis (10) Patent No.: US 6,353,739 B1
(45) Date of Patent: Mar. 5, 2002

(54) WIDE AREA PAGING SYSTEM HAVING AUTOMATIC SERVICE AREA LOG-IN

(75) Inventor: Walter Lee Davis, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/169,048

(22) Filed: Dec. 20, 1993

(51) Int. Cl.[7] .............................. H04Q 7/20; H04M 3/42
(52) U.S. Cl. ........................ 455/428; 455/426; 379/217
(58) Field of Search .............................. 379/93.07, 170; 455/426, 428, 464, 466, 3.01, 455, 461; 358/442, 400, 468

(56) References Cited

U.S. PATENT DOCUMENTS

| | | | |
|---|---|---|---|
| 4,178,476 A | 12/1979 | Frost | 179/2 |
| 4,644,347 A | 2/1987 | Lucas et al. | 340/825.04 |
| 5,065,423 A * | 11/1991 | Gaskill | 379/57 |
| 5,090,050 A * | 2/1992 | Heffernam | 379/60 |
| 5,111,197 A * | 5/1992 | Ichikawa | 379/57 |
| 5,117,449 A * | 5/1992 | Metroka et al. | 379/57 |
| 5,153,903 A * | 10/1992 | Eastmond et al. | 379/57 |
| 5,162,790 A | 11/1992 | Jasinski | 340/825.44 |
| 5,166,773 A * | 11/1992 | Hoff | 379/57 |
| 5,175,758 A * | 12/1992 | Levanto et al. | 379/57 |
| 5,202,912 A | 4/1993 | Breeden et al. | 379/57 |
| 5,247,700 A * | 9/1993 | Wohl et al. | 455/33.1 |
| 5,278,890 A * | 1/1994 | Beeson, Jr. et al. | 379/57 |
| 5,307,400 A * | 4/1994 | Sawyer et al. | 379/59 |
| 5,398,280 A * | 3/1995 | MacConnell | 379/57 |
| 5,451,839 A * | 9/1995 | Rappaport | 379/59 |

* cited by examiner

*Primary Examiner*—Madeleine Nguyen
(74) *Attorney, Agent, or Firm*—Keith A. Chanroo; Randi L. Dulaney (57) ABSTRACT

A combination pager and cordless telephone (40) has a receiver (414) for receiving paging signals including a location identifier associated with a geographic location (202) of a paging controller transmitting the paging signals. A decoder (416) coupled to the receiver (414) decodes the paging signals to recover a page and the location identifier. A memory (422, 423) stores the page and the location identifier identifying the geographic location (202) of the transceiver (40). A message processor (606), coupled to the memory (423), determines when a new location identifier is received; and a controller (420) couples to a home paging controller (10) in response to the message processor (606) determining that the new location identifier has been received. A transmitter (440), coupled to the controller (420, 430), transmits the new location identifier to the home paging controller (10) for informing the home paging controller (10) that the transceiver (40) is located in the new geographic location (210) indicated by the location identifier.

1 Claim, 8 Drawing Sheets

WIDE AREA PAGING SYSTEM HAVING AUTOMATIC SERVICE AREA LOG-IN

FIELD OF THE INVENTION

This invention relates in general to a combination paging system and radio telephone system, and in particular to a method and apparatus for transmitting pages over a wide area to a radio paging receiver coupled to a radio telephone transceiver for automatic service area log-in.

BACKGROUND OF THE INVENTION

Paging (or selective call) systems normally provide one-way radio frequency (RF) communication of selective call messages (pages) from a message originator to a paging receiver. The message originator contacts the paging system via the public switched telephone network (PSTN) system or other input interface, and provides the message information to a paging controller. Typically, the message information is encoded into a conventional signaling protocol, modulated onto a carrier signal, and transmitted as an RF signal over a paging channel to the paging receiver. The paging receiver receives the signal, demodulates, and decodes the signal to recover the message, and presents the message to a user of the paging receiver.

Air time is a precious commodity in paging systems. A paging service provider that wishes to provide service to a large number of subscribers (paging receiver users) must do so in a cost effective manner to make the paging system commercially viable. These paging system subscribers tend to be mobile and can roam over a wide geographic area while still expecting to receive pages over the wide geographic area. Further, a paging channel tends to limit the number of messages that can be transmitted therethrough because it has a limited bandwidth. Therefore, service providers wishing to service the ever increasing numbers of subscribers over a wide geographic area do so by segmenting the wide geographic coverage area into a plurality of smaller service areas for transmitting more pages thereinto in a parallel fashion to enhance overall system throughput.

A problem arises when a subscriber roams from service area to service area and the service provider has to keep track of such roaming to make sure that any pages transmitted to a roaming subscriber will reach the paging receiver. Typically, this has been accomplished by requiring the subscriber to provide an itinerary and schedule to the service provider before departing on a trip. The service provider would manually configure a paging system subscriber data base to send pages destined for the roaming subscriber to the destination service area (or service areas) corresponding to the itinerary and schedule. Upon returning home from the trip, the subscriber again would contact the service provider to reconfigure the paging system subscriber data base for sending pages destined for the subscriber to the home service area(s). This can be a laborious endeavor, and is subject to human error during manual entry, which tends to reduce the efficiency and accuracy of the paging system operations thereby adding operational costs and potentially frustrating customers who missed pages sent to incorrect destination service areas.

Thus, what is needed is a wide area paging system that can automatically keep track of service areas for roaming subscribers.

SUMMARY OF THE INVENTION

In one form of the invention, there is provided a method for communicating comprising the steps of: (a) transmitting paging signals having a location identifier associated with a geographic location; (b) receiving location update signals for identifying the geographic location of a transceiver transmitting same; (c) decoding the location identifier incorporated in the location update signals and storing the location identifier associated with the transceiver transmitting same; (d) receiving paging messages; (e) routing the paging messages addressed to the transceiver located in another geographic location in response to the location identifier associated with the transceiver; and (f) transmitting the paging messages addressed to the transceiver located in the geographic location of the paging system.

In another form, a transceiver comprises a receiver for receiving paging signals that includes a location identifier associated with a geographic location of a paging transmitter transmitting the paging signals. A decoder coupled to the receiver decodes the paging signals to recover a page and the location identifier. A memory stores the page and the location identifier identifying the geographic location of the transceiver. A message processor, coupled to the memory, determines when a new location identifier is received; and a controller initiates a return location identifier transmission to a home paging controller in response to the reception of the new location identifier. A transmitter, coupled to the controller, transmits the new location identifier to the home paging controller for informing the home paging controller that the transceiver is located in the new geographic location indicated by the location identifier.

DETAILED DESCRIPTION OF THE INVENTION

Figure 1:
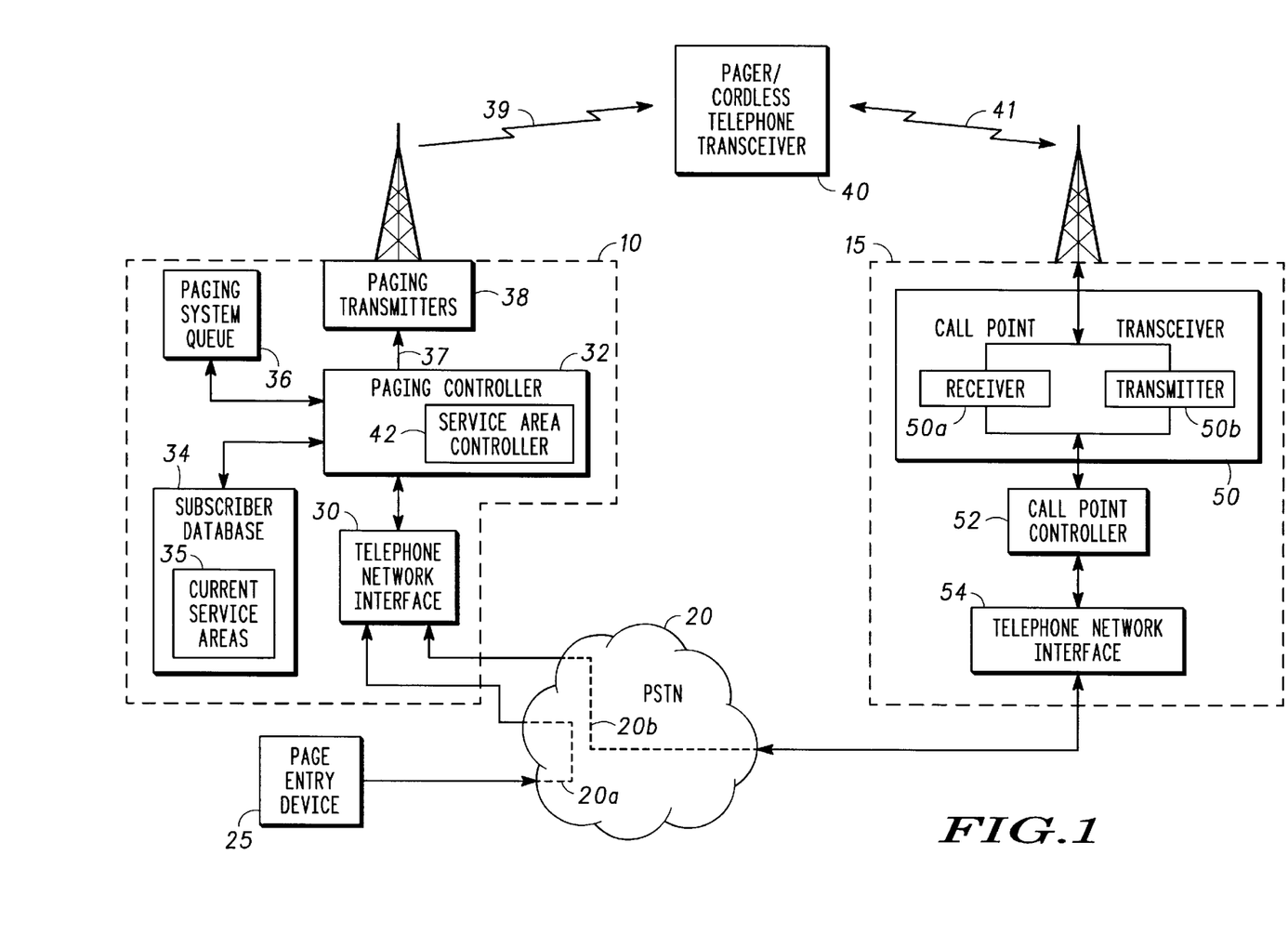
FIG. 1 is a diagram of a combination selective call system and cordless telephone system in accordance with the preferred embodiment of the present invention.

Referring to FIG. 1, a selective call signaling (paging) system combining communication across a first communication path at a first data rate, for example to a wide area paging system 10, and a second communication path at a second data rate, for example to a second generation cordless telephone (CT-2) system 15. The selective call signaling system uses a public switched telephone network (PSTN) 20 for communication therebetween. A message originator utilizes a page entry device 25 to enter paging information via the PSTN 20 for transmission to a subscriber of the paging system 10.

Typically, the page entry device 25 is a telephone for entry of voice or numeric information. The page entry device 25 could also comprise a data processing device, for example a page entry terminal or computer terminal, for generation of the paging information comprising graphics, facsimile or alphanumeric information.

The originator comprises the message to be provided as the paging information on a computer terminal, and by placing a call via a modem or other device via a system access number of the paging system 10, the originator couples the page entry device 25 to a telephone network interface 30 of the paging system 10 via PSTN path 20a. The paging information is then transported from the page entry device 25 to the telephone network interface 30 and then to a paging controller 32 for processing thereby. The paging controller 32 accesses a subscriber data base 34 coupled thereto to obtain a subscriber address to associate with the paging information to form a page. The paging controller 32, according to the preferred embodiment of the present invention, retrieves current service area information (location identifier) 35 from the subscriber data base 34 for completing the page. The current service area information 35 indicates what destination coverage area (or coverage areas) for the paging system to transmit the page at the first data rate to reach the subscriber receiver or pager 40. The controller 32 then places the page including the service area information into the paging system queue 36 for later transmission of the page into the coverage area (or coverage areas) indicated by the current service area information 35.

The pages stored in the paging system queue 36 are retrieved sequentially by the paging controller 32 and provided to the paging transmitters 38 over a communication link 37, for example over telephone line, over radio frequency link, over microwave link, over satellite communication link, or a combination thereof. It is appreciated that the paging transmitter(s) 38 may not be located proximate to the paging controller 32, and according to the preferred embodiment of the present invention, the paging transmitter(s) 38 are at different (or distant) geographic regions (or coverage areas). The paging controller 32 comprises a service area controller 42 which selects the destination paging transmitters 38 for coupling the pages thereto as indicated by the current service area information 35 for the routing the pages. Specifically, the pages are destined for transmission as selective call signals from the paging transmitters 38 over at least one paging channel covering a plurality of paging coverage areas.

A wide area paging system typically includes a plurality of paging transmitters 38 which can transmit the selective call signals over a plurality of paging coverage areas to increase the probability of message reception by a roaming paging receiver 40. In a first alternative approach, a plurality of the paging coverage areas are at least partially overlapping and are covered by simulcasting paging transmitters which are synchronized to transmit pages in the overlapping coverage areas. The plurality of overlapping paging coverage areas which are covered by simulcasting paging transmitters are considered as one service area. In a second alternative approach, a plurality of paging coverage areas are non-overlapping and are covered by individual non-simulcasting paging transmitters. Each non-overlapping paging coverage area is considered as a separate service area. In a third approach, a combination of overlapping and non-overlapping paging coverage areas are utilized to effectively cover a geographic area to increase the probability of message reception by roaming paging receivers 40. Here, each non-overlapping paging coverage area is considered as a separate service area; and a plurality of overlapping paging coverage areas are considered as a single service area, where both types topologies exist in a wide area paging system, the geographic area is more effectively covered.

In the preferred embodiment of the present invention, the selective call signals 39 transmitted from the paging system 10 are received by a transceiver which preferably comprises a combination selective call receiver (pager) and radio telephone, for example a combination selective call receiver and cellular telephone, a combination selective call receiver and cordless telephone transceiver 40, or an acknowledge-back selective call receiver. The pager portion of the combination selective call receiver and cordless telephone transceiver 40 receives the selective call signals while the cordless telephone transceiver portion, for example a second generation cordless telephone (CT-2) transceiver, can couple to the PSTN 20 via the cordless telephone system 15 for communication therewith.

In accordance with the present invention, the paging controller 32 processes a page request from a caller and generates a page therefrom. Subsequently, the paging controller 32 transmits the page via the paging transmitters 38 to the pager/cordless telephone transceiver 40. The service areas (comprising a plurality of paging coverage areas) over which the page is transmitted 39 are determined by the service area controller 42 from the current service area information 35 for the pager/cordless telephone transceiver 40. These service areas correspond to the geographic areas in which a roaming pager/cordless telephone transceiver 40 is actually located in.

In one aspect of the present invention, the paging system 10 periodically transmits a unique service area (location) identifier over each of the service areas or geographic locations. The location identifier identifies to the receiving pager/cordless telephone transceivers 40 the service area (geographic location) in which they are currently receiving pages. Therefore, when the pager/cordless telephone transceiver 40 receives the location identifier, it can determine therefrom that it has roamed to another service area when the new location identifier is different from the "home" service area's location identifier. The "home" service area of the pager/cordless telephone 40 is the service area assigned to the pager/cordless telephone 40 when it is not roaming.

Upon receipt of a signal indicating a different location identifier, the pager portion determines if the location is different from its "home" service area, when it is, the new location identifier is stored. The cordless telephone transceiver is then instructed to inform the "home" service area of the new location of the pager/cordless telephone transceiver 40. The cordless telephone transceiver couples to the nearest cordless telephone call point station of the cordless telephone system 15 by signaling a call point transceiver 50 comprising a receiver 50a and a transmitter 50b. Location update signals from the transceivers are preferably transmitted at a second data rate. The location update signals received by the receiver 50a are provided to a call point controller 52 for processing thereby. Once coupled thereto, the pager/cordless telephone 40 transmits the location update signals via the call point controller which couples to the PSTN 20 via a telephone network interface 54 to call up the "home" service area paging system 10 via the path 20b to the "home" service coverage area. Once the call point controller 52 calls up the "home" paging controller 32, the location identifier is retrieved and transmitted to the paging controller 32 of the "home" service coverage area so pages can be automatically routed to the new service coverage area currently serving the pager/cordless telephone 40.

The second communication path could, alternatively be a cellular telephone system comprising cellular telephone bases sites for coupling a cellular handset to the PSTN 20. The pager would be combined with a cellular handset to allow coupling to the paging controller 32 via the cellular telephone system. Also, in a third embodiment, the pager is a selective call receiver having acknowledge-back (ackback) capability for coupling with the paging controller 32 via a communication channel reserved for ackback responses from ackback pagers. In this case, the location update signals would be received by a network of base station receivers coupled to the PSTN 20. The base station receivers forming the network are similar to the CT-2 call points shown in FIG. 1 but without the transmitter portion of the CT-2 call points.

Figure 2:
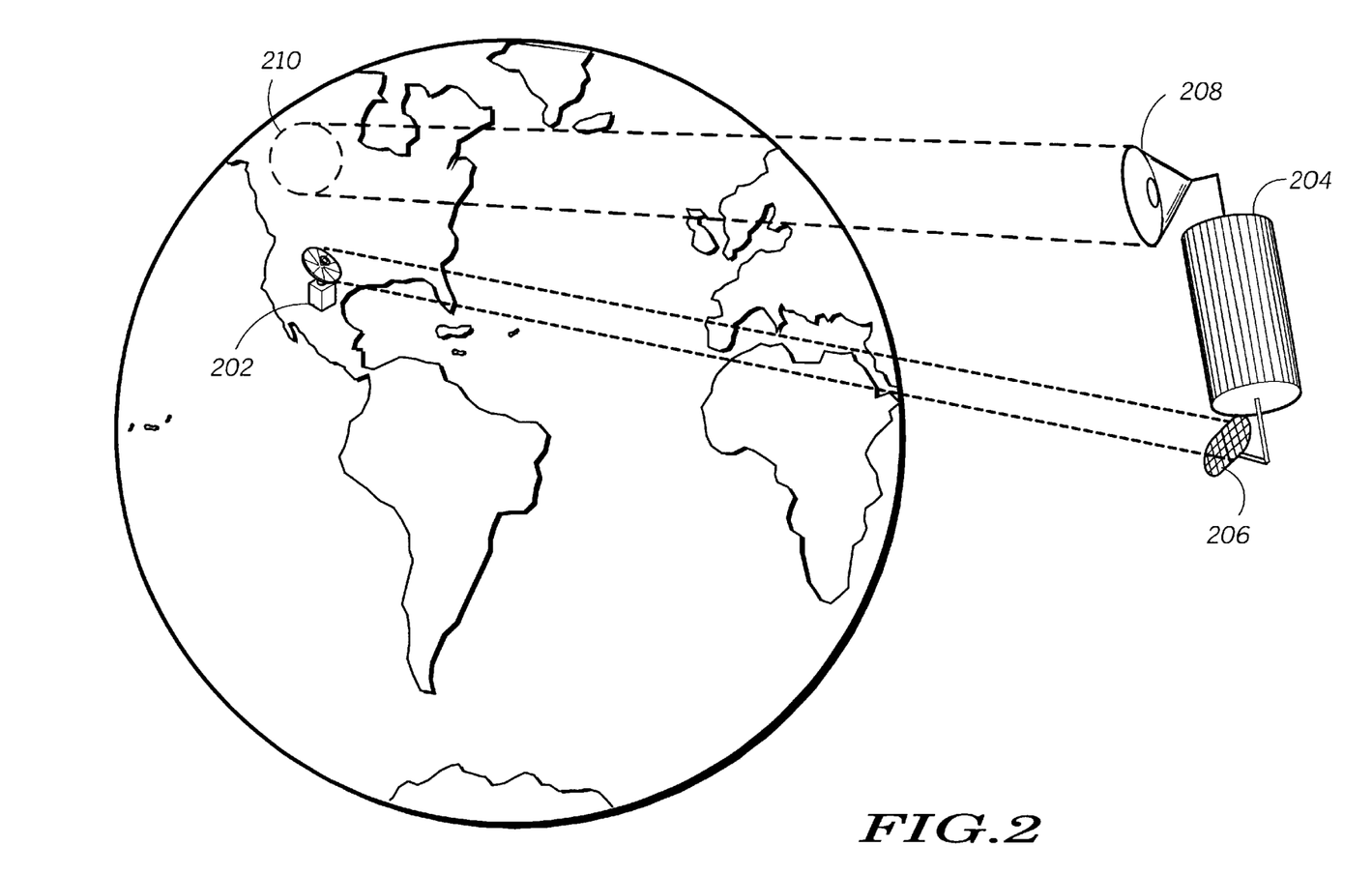
FIGS. 2 and 3 are illustrations of a wide geographic area paging system in accordance with the preferred embodiment of the present invention.
Figure 3:
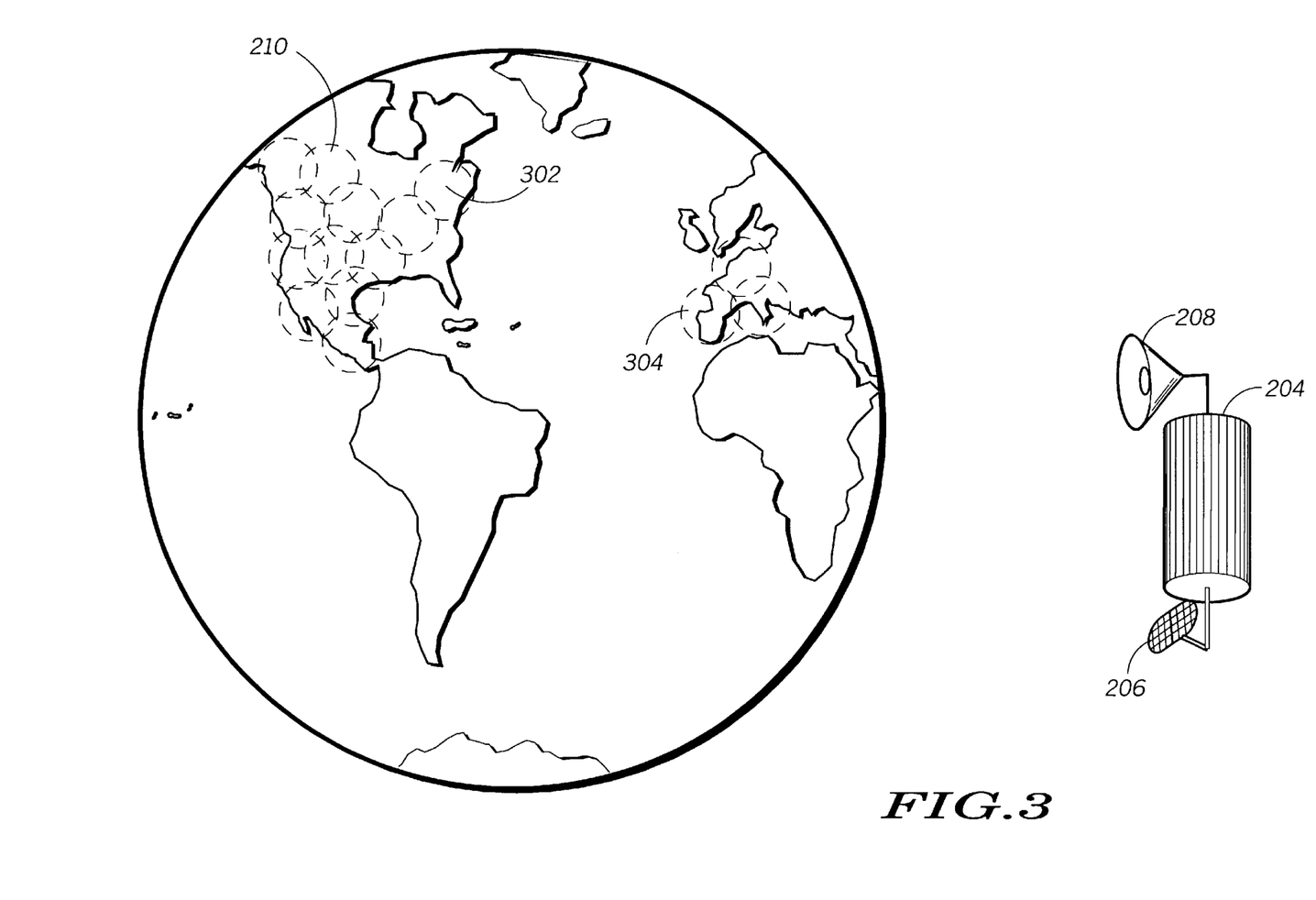

FIGS. 2 and 3 are illustrations of wide geographic area paging systems. Specifically, FIG. 2 illustrates a paging system service area (geographic location) paging system 202 capable of transmitting pages to a satellite transceiver 204. The satellite transceiver 204 comprises a satellite receiver 206 for receiving pages which can be processed by the satellite transceiver 204 before being transmitted by a satellite transmitter 208 in another service area in a different geographic area 210. FIG. 3 similarly illustrates the satellite transceiver 204 having receiver 206 and transmitter 208 which couple different geographic coverage areas irrespective of their relative locations. For example, the satellite transceiver 204 couples geographic coverage area 210 with geographic coverage area 302, both located on the same continent; and couples geographic coverage area 210 with geographic coverage area 304, both located on different continents. In this way, the pager/cordless telephone transceivers 40 are able to roam all over the world while still receiving their pages without any actions from the subscribers of these roaming pager/cordless telephone transceiver 40 (automatically).

Figure 4:
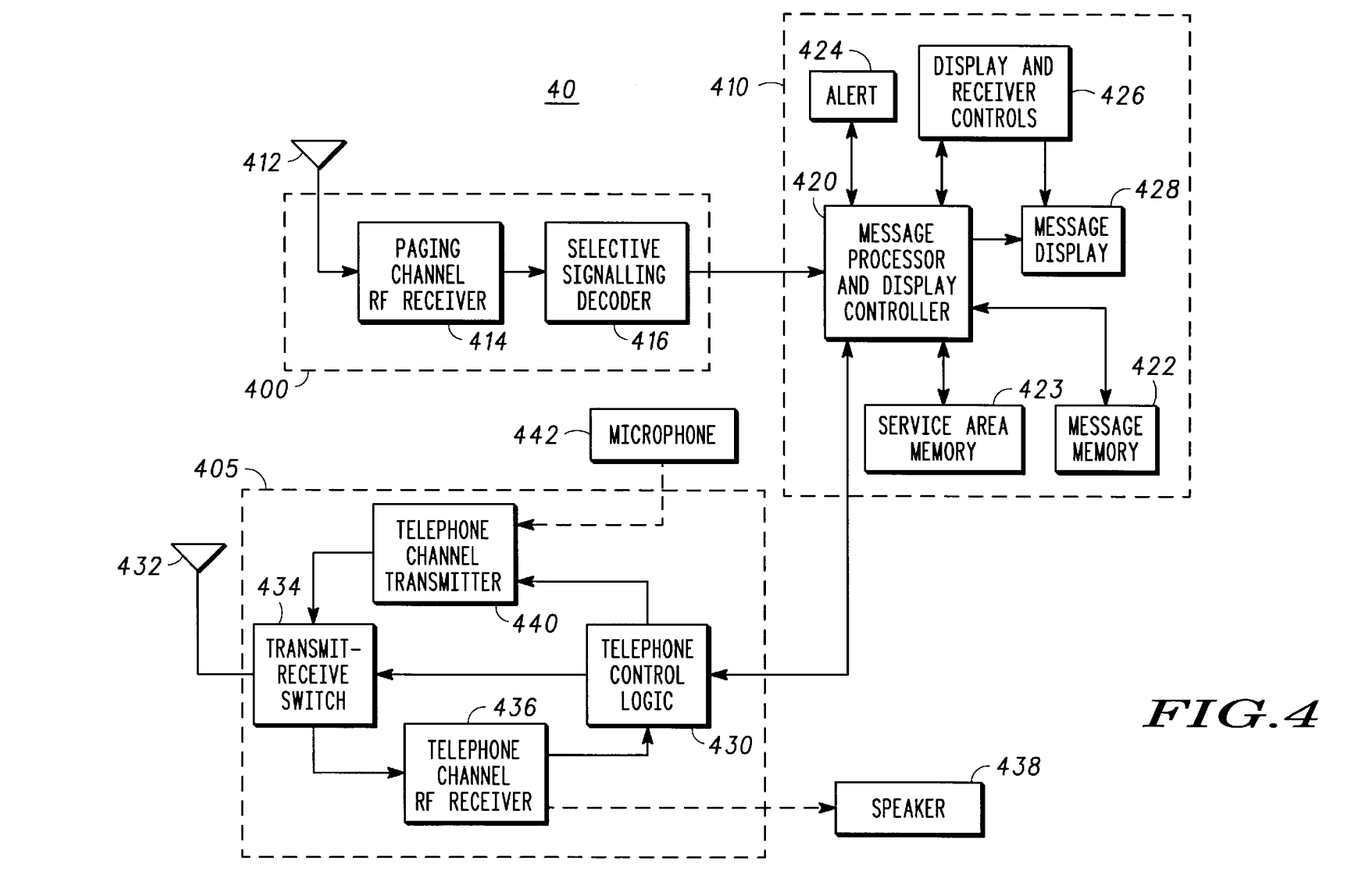
FIG. 4 is a block diagram of the combination pager and cordless telephone transceiver of FIG. 1 in accordance with the preferred embodiment of the present invention.

Referring to FIG. 4, the combination pager and cordless telephone transceiver 40 according to the preferred embodiment of the present invention is shown. The pager and cordless telephone transceiver 40 comprises a paging receiver section 400, a cordless telephone transceiver section 405, and a message and display controller section 410. The paging receiver section 400 includes an antenna 412 for receiving the selective call (paging) signals. A paging channel radio frequency (RF) receiver 414 coupled to the antenna 412 demodulates the selective call signals, and a selective signaling decoder 416 decodes the demodulated signal to recover the page transmitted therein.

The decoded page is provided to a message processor and display controller 420 for processing thereby. The decoded page is stored in a message memory 422 and the user (subscriber) is alerted via an alert device 424 that a page has been received. The user can activate user display controls 426 to retrieve the page from the message memory 422 and to display the page on a message display 428. The controls 426 can manipulate the message display 428 or alter receiving parameters in a manner well known to those skilled in the art.

Operation of the cordless telephone transceiver section 405 is controlled by a telephone control logic device 430. An antenna 432 is utilized for transceiving signals for conventional transceiver operation. The antenna 432 is coupled to a transmit-receive switch 434 which operates under the control of the telephone control logic 430. The transmit-receive switch 434, in one position, couples the antenna 432 to a telephone channel RF receiver 436 for processing received RF signals and providing the signals to the telephone control logic 430. In a second position, the transmit-receive switch 434 couples the antenna 432 to a telephone channel transmitter 440 which processes signals received from the telephone control logic 430 for transmittal as an RF (location update) signal from the antenna 432.

In an alternate embodiment, a speaker 438 can be coupled to the receiver 436 and a microphone 442 can be coupled to the transmitter 440 for conventional cordless telephone operation. In the alternative embodiment, the receiver 436 would provide audio portions of the signals to the speaker 438 and digital portions of the signals to the telephone control logic 430. The transmitter 440 would process audio signals received from the microphone 442 and digital signals received from the telephone control logic 430 for transmission from the antenna 432.

In accordance with the preferred embodiment of the present invention, the telephone control logic 430 is coupled to the message processor 420 for initiating the transmission of location update signals including the location identifier to the "home" service area. When the message processor 420 detects and decodes a location identifier different from that currently stored in a service area memory 423, the new location identifier is stored in the service area memory 423, and the telephone control logic 430 is signaled to call up the home paging controller 32 through transmission of the location update signals to a call point transceiver 50 (FIG. 1). Once the telephone control logic 430 is coupled to the paging controller 32 (FIG. 1), the location identifier is retrieved from the location update signals by the message processor 420 and transmitted under control of the telephone control logic 430. The telephone control logic 430 signals the transmit-receive switch 434 which enables the telephone channel transmitter 405 via the antenna 432 to send the location update signals having the location identifier to the "home" service coverage area at a second data rate. Specifically, the CT-2 telephone portion of the pager/cordless telephone 40 couples with the call point transceiver 50 and, as discussed in FIG. 1, the connection is made to the paging system 10 via the PSTN. Subsequent to the connection, the location identifier is then transmitted to the "home" service coverage area where the location identifier is stored in the "home" service areas 35 of the subscriber data base 34.

In this way, when the "home" service area receives a page to be transmitted to the pager/cordless telephone 40 which is roaming in a different service coverage area (geographic location) of which the location identifier is known, the "home" service area checks its current service areas 35, and reroutes the page to be transmitted in the appropriate service area. It is well known by one skilled in the art how to categorize and store information associated with its pager/cordless telephone 40, and how to reroute pages to be transmitted in different service areas. Preferably, the paging controller of the home geographic location generates a message routing request when a page is received addressed to a transceiver located in a new geographic location. Therefore, according to the preferred embodiment of the present invention, the pager/cordless telephone 40, when it receives a different location identifier, knows that it is in a different service area. It then transmits the new location identifier to the "home" service area. The "home" service area stores the location identifier, and uses it to automatically reroute all pages to that pager/cordless telephone 40 indicated by the location identifier.

Figure 5:
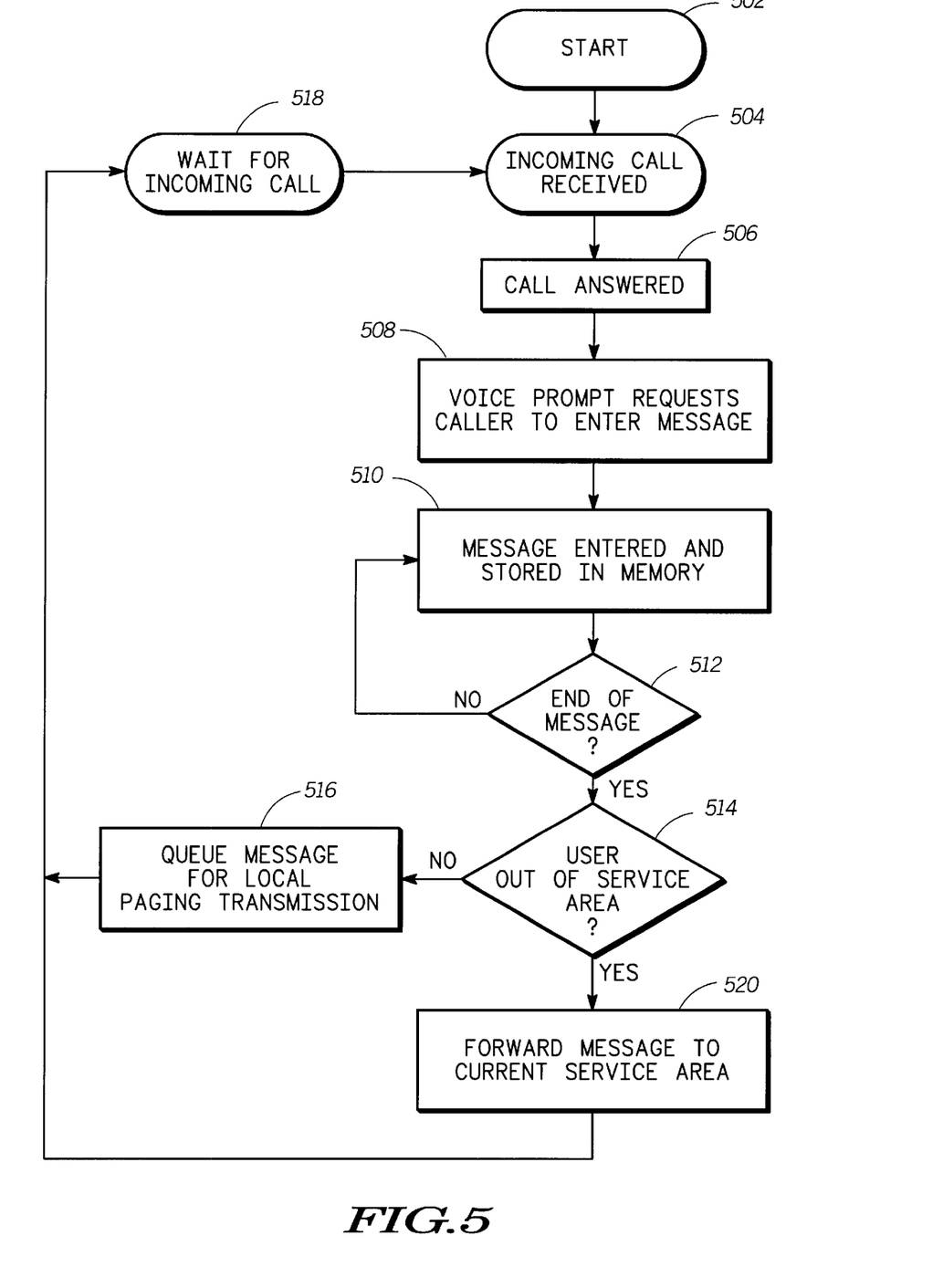
FIGS. 5 to 8 are flow diagrams illustrating operational sequences for the combination paging system and cordless telephone system of FIGS. 1 and 4 in accordance with the preferred embodiment of the present invention.

Referring next to FIG. 5, a flow diagram illustrating the message entry and message routing operations of the paging system in accordance with the preferred embodiment of the present invention. After startup 502, the telephone network interface 30 (FIG. 1) awaits reception of an incoming call 504 from a page entry device 25 (FIG. 1). When an incoming call is received and answered 506, the paging controller 32 generates a voice prompt 508 requesting the caller (e.g., the message originator) to enter the message followed by an "end" signal. The "end" signal, as is well known, indicates the end of the message. The paging controller 32 continues to process and store the incoming message 510 until the "end" signal is received 512.

Next, the subscriber identification code (ID) and location identifier is recalled from the subscriber data base 34 (FIG. 1) 514 for determining whether the pager/cordless telephone transceivers 40 has roamed to another geographic service area. The pager/cordless telephone transceivers 40 informs the "home" service area that the pager/cordless telephone transceivers 40 is located in another service area indicated by the transmitted location identifier. Therefore, when the paging system receives a page for a pager/cordless telephone 40 determined to be located outside its "home" service area, the paging controller 32 calls the service area indicated by the location identifier and reroutes the page (message) to the other service area 520 for transmission of the message to the pager/cordless telephone transceiver 40. The paging controller 32 knows the pager/cordless telephone 40 is located outside its "home" service area because the pager/cordless telephone 40 has previously informed the "home" paging system of its current geographic location. Preferably, by assigning each location identifier a telephone number of the geographic location of the paging system, each paging system, that has the information stored in memory, is able to determine the geographic location to reroute paging messages addressed to that transceiver. Therefore, by allocating each geographic location (service area) with unique location identifier, the home paging system is able to determine the geographic location of the transceiver that logged-in with the new location identifier. The paging controller 32, upon receipt of the location identifier, stores the new location identifier. When it receives pages for that pager/cordless telephone 40, the paging controller, retrieves the location identifier to determine the pager/cordless telephone transceiver's 40 location, and reroutes the page to the geographic location identified by the location identifier. As is well known by one skilled in the art, the rerouting of page can be accomplished by a satellite or microwave links or any equivalent communication links suitable for such transfer.

However, when the location identifier is the same as the "home" service area 514, the message is queued for local transmission 516. Subsequent to steps 520 and 516, the process continues to wait for other incoming calls 518. In this way, once the "home" service area is informed that a pager/cordless telephone is roaming (by the receipt of another location identifier), the paging controller is able to automatically reroutes all paging messages to the pager/cordless telephone 40 that have logged the changed location identifier. According to this invention, the pager/cordless telephone transceiver 40 can roam anywhere in the world, and still receive its pages automatically because they have informed the "home" paging system of the service area in which they are currently located.

Figure 6:
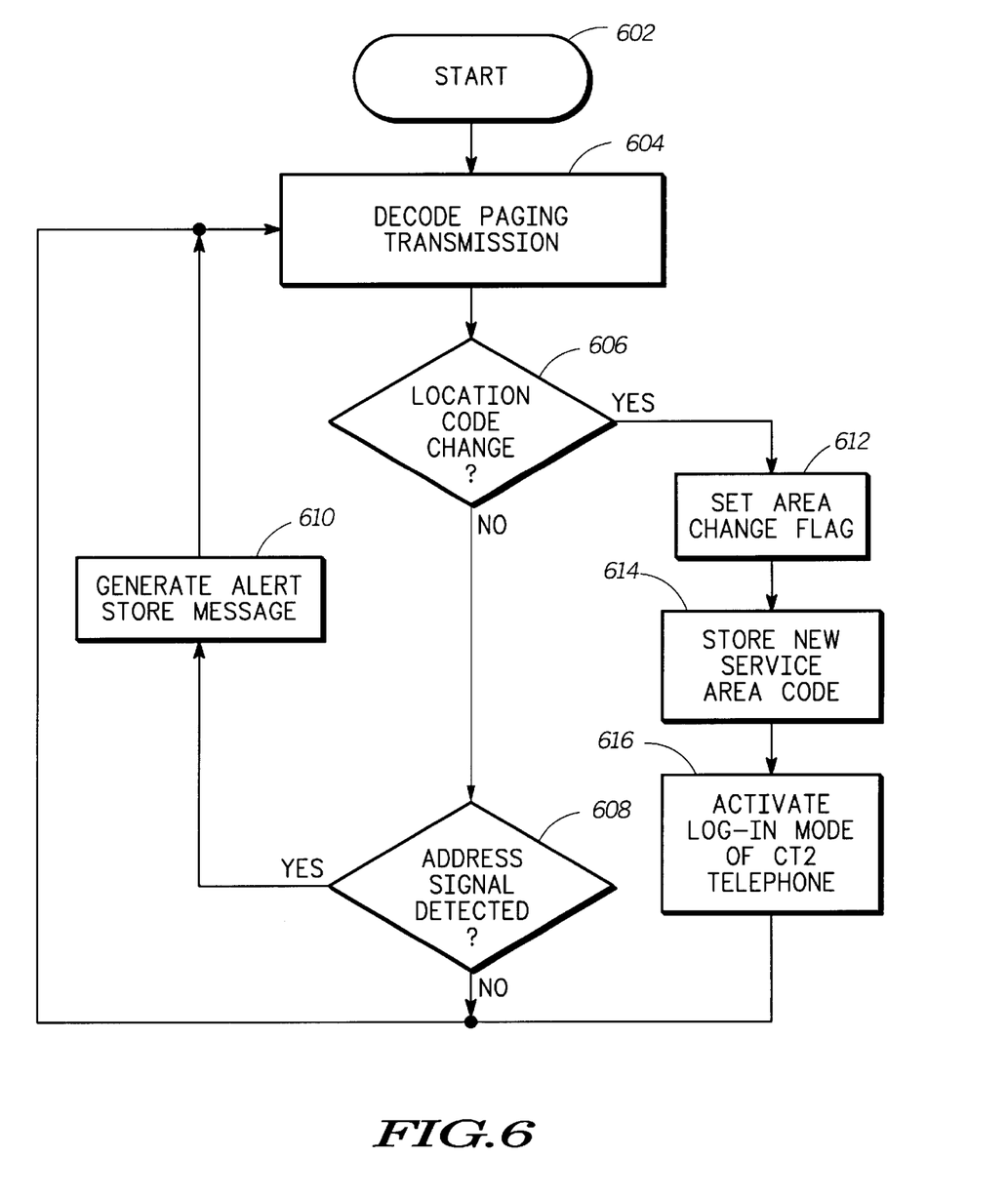

Referring to FIG. 6, a flow diagram of the operation of the pager portion of the combination pager/cordless telephone transceiver 40 according to the preferred embodiment of the present invention is illustrated. After the startup 602, the pager begins to receive and decode paging transmission including the location identifier 604. The location identifier is indicative of the service geographic area of the paging system, and a pager that receives a location identifier can determine if it has changed geographic location 606 by comparing its home location identifier with the received location identifier. In response to step 606, when a pager/cordless telephone has received a new location identifier different from its "home" location identifier, the pager/cordless telephone knows that it is roaming. The pager/cordless telephone 40 sets an area change flag to indicate a new service area 612. The new service area identifier (location identifier) is then stored in the pager 614. Subsequent to storing the location identifier, the message processor 420 via the telephone logic controller activates the log-in mode of the CT-2 telephone 616, the detail will be discussed below.

Alternatively, in response to step 606, when the location identifier is the same, the pager proceeds in the conventional manner interrogating the paging signals to detect its address 608. When the pager has detected its address, the pager generates an alert and stores the message for retrieval by its user 610. However, when the pager fails to detect its address or after step 610, the pager continues to decode paging transmissions 604. In this way, the pager portion of the pager/cordless telephone can automatically determine that it is roaming. The pager/cordless telephone 40 informs its "home" service of its current location when the pager/cordless telephone 40 has received a location identifier different from its "home" or different from any other location identifier previously received. Therefore, the pager portion, by setting a flag, indicates that the pager/cordless telephone is roaming (away from its home service area), and substantially simultaneously, the cordless telephone portion activates the call-in mode to log-in with the "home" service area that the pager/cordless telephone 40 is located in the service area identified by the location identifier which is transmitted to the "home" paging system.

Figure 7:
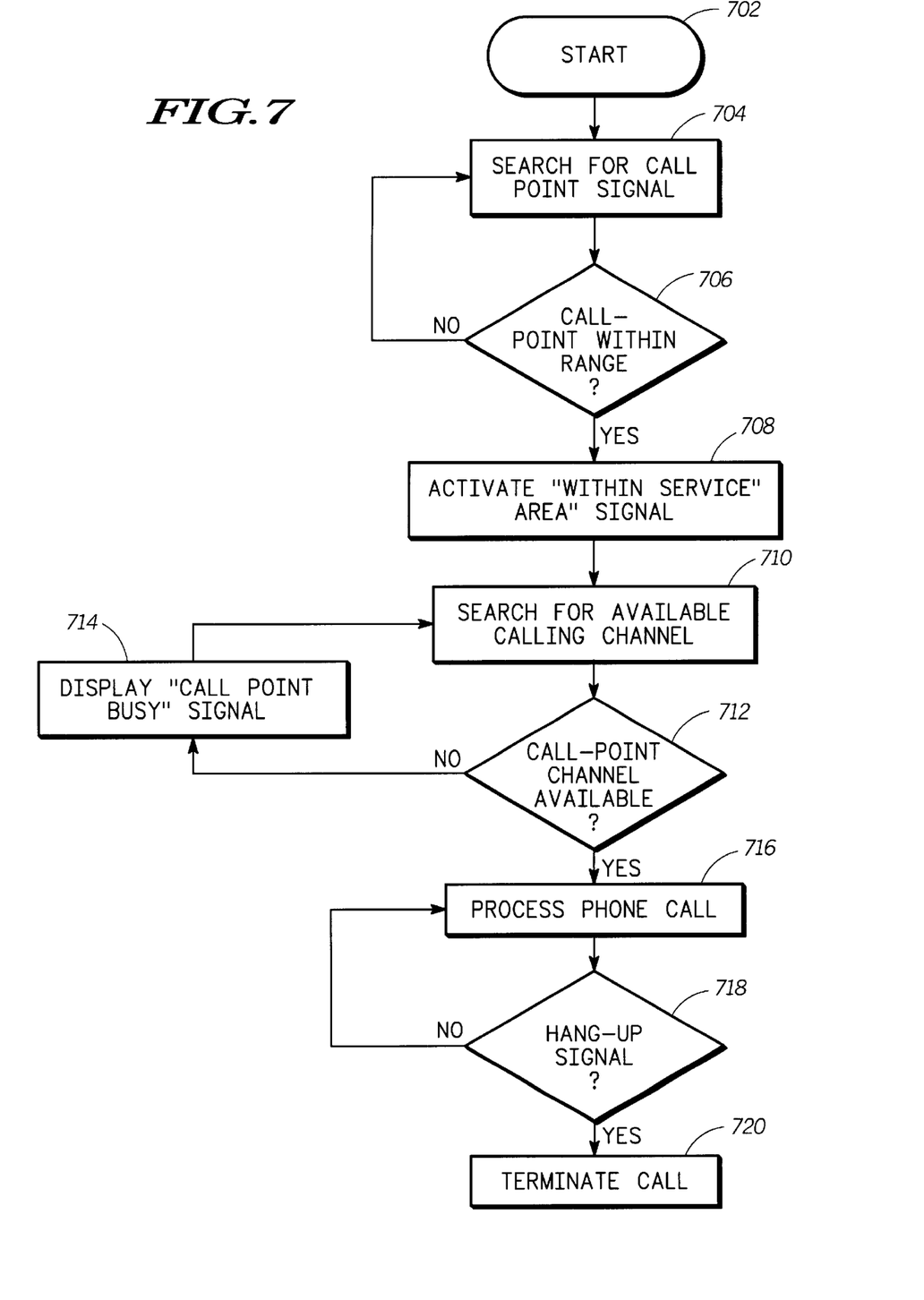

Referring next to FIG. 7, a flow diagram illustrating the call processing operation of the cordless telephone in accordance with the preferred embodiment of the present invention is shown. After startup 702, the message processor 420, upon receipt of a new location identifier, activates the telephone control logic 430 to begin searching for a call point within range 704. When the call point signal is detected, the cordless telephone determines, by conventional techniques, if the call point is within range 706. If not, the cordless telephone continues searching for other call point signals 704. However, when a call point is within range, the cordless telephone activates the "within service area" channel 708 indicating that outgoing call can be initiated. Thereafter, a search for an available call channel begins 710, and if none is available, the cordless phone displays "call point busy" signal 714 and the search continue 710.

However, when there is an available call channel 712, the cordless telephone initiates and begins to process the telephone call 716. The call processing continues until one side terminates the call which generates the hang-up signal 718. Upon receipt of the hang-up signal, the call is terminated 720.

Figure 8:
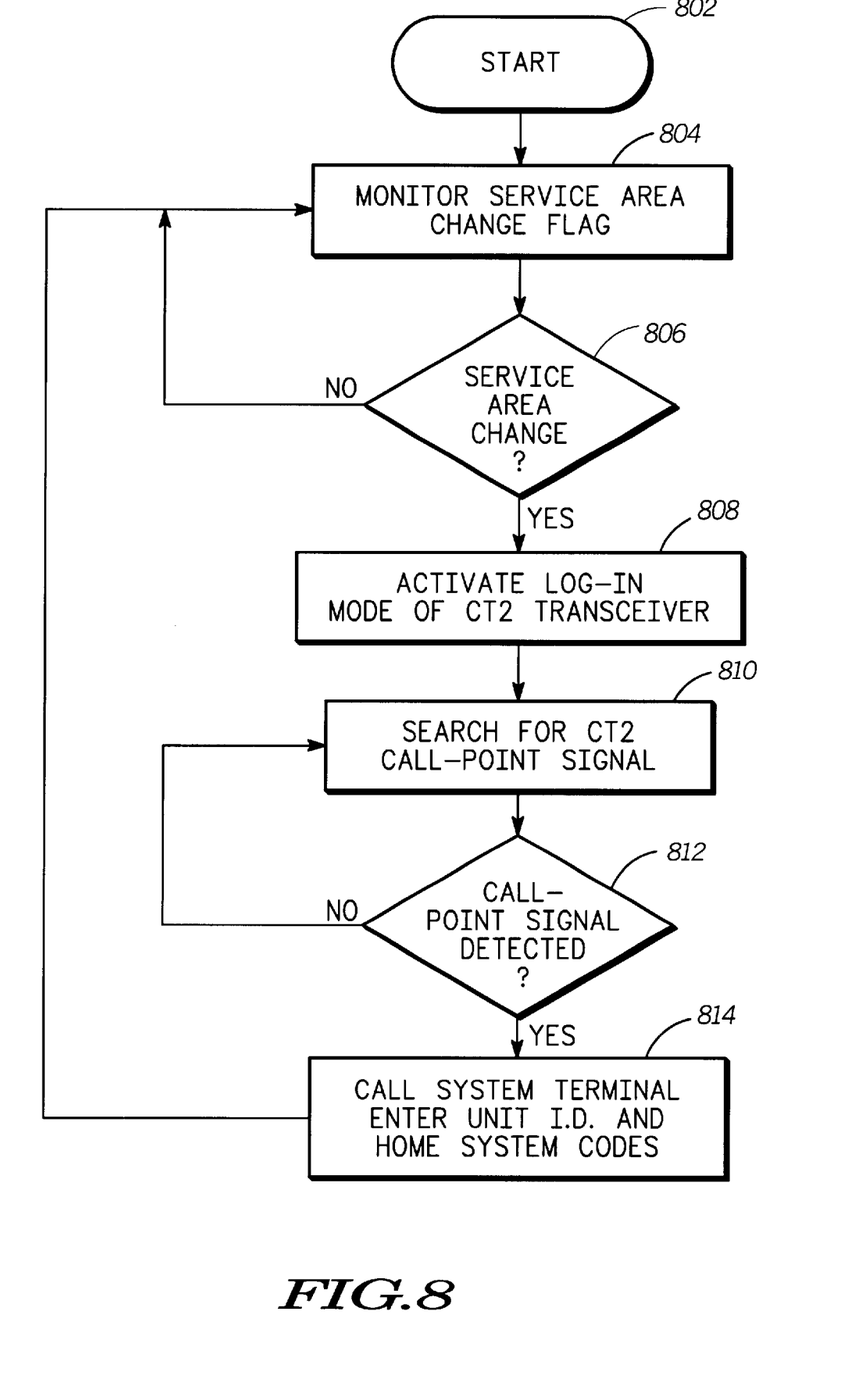

Referring to FIG. 8, a flow diagram illustrating the operation of the automatic log-in operation of the pager/cordless telephone in accordance with the preferred embodiment of the present invention is shown. After startup 802, the message processor 420 monitors the service area change flag of the pager/cordless telephone to determine when the pager/cordless telephone 40 has roamed to a new service area 804. When cordless telephone 40 has determined that the location identifier has changed 806, the cordless telephone portion activates the log-in mode of the cordless telephone 808. The cordless telephone generates an automatic service area log-in which is transmitted to the home service area. The cordless telephone begins to search for a CT-2 call point signal 810, and when a call point signal is not detected, the search continues 810. Upon detecting a call point signal, the cordless telephone determines if the call point is within range 812. Once the call point is determined to be within range, the call system terminal enters the unit identification and the home system code. This enables the new location identifier to be transferred to the home system to enable the home system to reroute all pages for that pager/cordless telephone transceiver to the service area where it is currently located.

The preferred embodiment of the present invention operates automatically and is transparent to the user. The location identifier is received and stored by the paging system. When the user is within range of a cordless telephone call point station 15, the message processor 420 signals the telephone control logic (controller) 430 (FIG. 4) to call up the home paging controller 32 (FIG. 1) to transfer the new location identifier of the pager/cordless telephone transceiver 40. The location identifier is retrieved and transmitted by the cordless telephone transceiver portion 40 to the home service area to enable automatic page transfer.

By now it should be appreciated that there has been provided a cooperative paging system and cordless telephone system which combines the best features of the two systems to provide improved paging throughput by allowing the home paging to log the service areas of the roaming pager/cordless telephone transceiver to enable the paging system to reroute incoming pages without undue burden on the paging system's signal capacity. The paging system provides normal paging operations and delivers messages to the pagers located within its home service area while the cordless telephone link is used to inform the home service area when the pager/cordless telephone is roaming.

In summary, in one form of the invention, there is provided a method for communicating comprising the steps of: (a) transmitting paging signals having a location identifier associated with a geographic location; (b) receiving location update signals from portable transceivers for identifying the geographic location of a transceiver transmitting same; (c) decoding the location identifier incorporated in the location update signals and storing the location identifier associated with the transceiver transmitting same; (d) receiving paging messages; (e) routing the paging messages addressed to the transceiver located in another geographic location in response to the location identifier associated with the transceiver; and (f) transmitting the paging messages addressed to the transceiver located in the geographic location of the paging system.

In another form, a transceiver comprises a receiver for receiving paging signals including a location identifier associated with a geographic location of a paging transmitter transmitting the paging signals. A decoder coupled to the receiver decodes the paging signals to recover a page and the location identifier. A memory stores the page and the location identifier identifying the geographic location of the transceiver. A message processor, coupled to the memory, determines when a new location identifier is received; and initiates a transmission of a location update signal to a home paging controller in response to the reception of the new location identifier. A transmitter, coupled to the controller, transmits the new location identifier to the home paging controller for informing the home paging controller that the transceiver is located in the new geographic location indicated by the location identifier.

What is claimed is:

1. In a combination paging system and telephone system, a method for communicating comprising the steps of:

(a) transmitting paging signals comprising paging messages and a location identifier associated with a geographic location of the paging system transmitting the same on a first communication path at a first data rate;

(b) receiving location update signals from a transceiver on a second communication path at a second data rate indicating the geographic location of a transceiver transmitting its location identifier from another geographic location;

(c) decoding the location identifier incorporated in the location update signals and storing the location identifier identifying the geographic location of the transceiver transmitting same;

(d) receiving paging message;

(e) routing the paging messages addressed to the transceiver located in the other geographic location in response to the location identifier associated with the transceiver; and (f) transmitting the paging messages addressed to the transceiver located in the geographic location of the paging system.

\* \* \* \* \*